HEADLAMP TIME DELAY CIRCUIT CONTROLLER
Filed Sept. 30, 1968
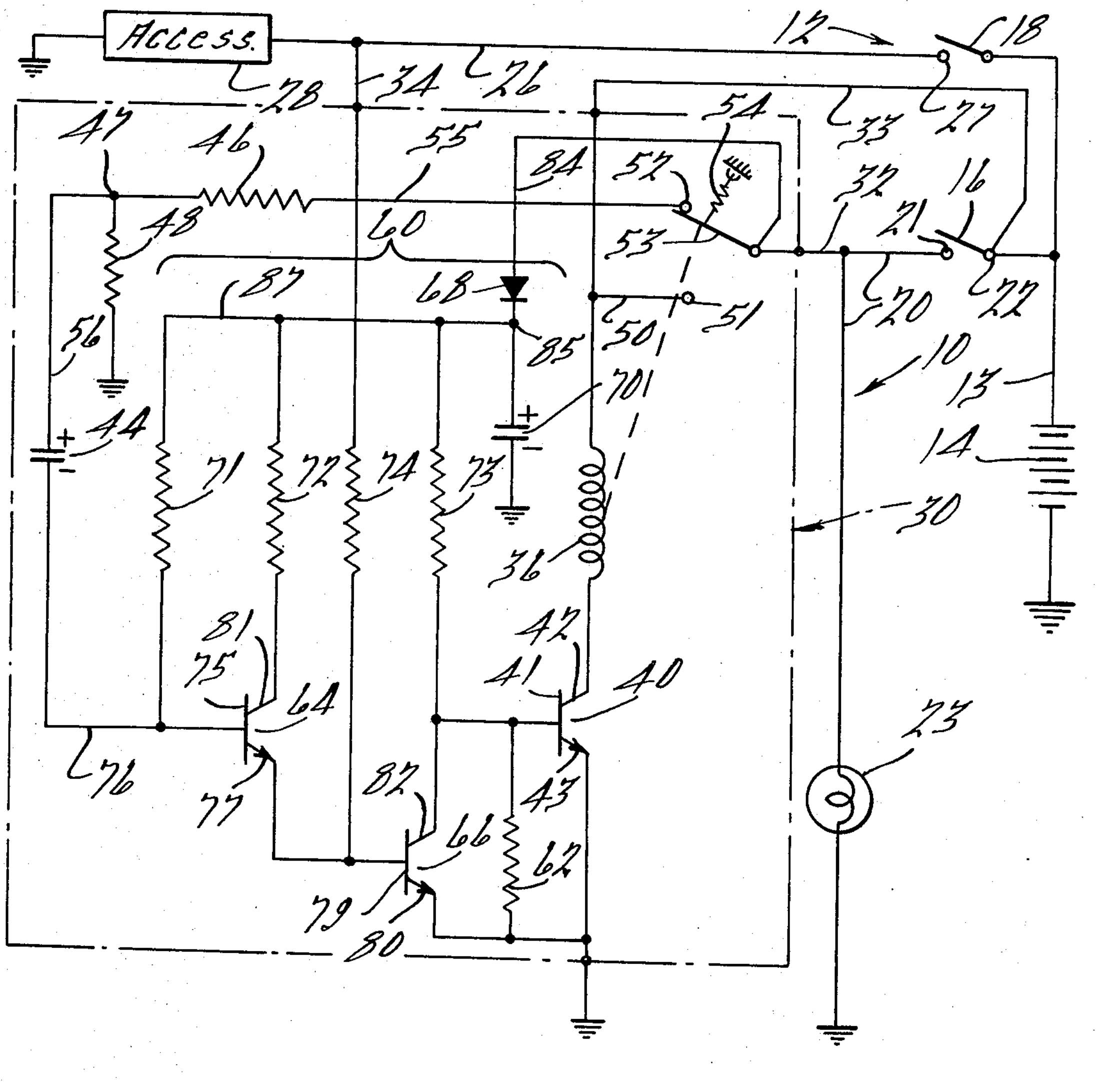
INVENTORS.
Gary A. Chunn
William M. Summers
BY
Harness, Talburtt & Baldwin
ATTORNEYS.

United States Patent Office 3,546,527

Patented Dec. 8, 1970

3,546,527

HEADLAMP TIME DELAY CIRCUIT CONTROLLER

Gary A. Chunn and William M. Summers, Huntsville, Ala., assignors to Chrysler Corporation, Highland Park, Mich., a corporation of Delaware Filed Sept. 30, 1968, Ser. No. 763,701
Int. Cl. B60q 1/02
U.S. Cl. 315—82 13 Claims

ABSTRACT OF THE DISCLOSURE

A headlamp time delay circuit controller featuring a charge level sensing and threshold switching circuit between an RC timing network and a transistor controlled relay switching means, which provide an auxiliary energizing circuit about the vehicle headlamp switch when the latter is displaced from its closed to its open position. The sensing circuit is responsive to the charge level attained by the timing capacitor network during the charging interval thereof initiated upon the opening of the headlamp switch. During the delay period, constant base current drive is supplied to the transistor enabling accurate control of the timing period of the controller substantially independent of temperature and voltage variations.

BACKGROUND

Field of the invention

This invention relates to time delay controllers for vehicle lighting circuits and, more particularly, to an improved form of headlamp time delay controller operative during a charging interval of a charging capacitor timing network.

Prior art

Prior forms of time delay controllers utilize the discharge of a previously charged capacitor timing network to control the conduction periods of a transistor controlled switching device. The base current drive of the transistor is derived directly from the decaying voltage of the discharging capacitor and is amplified by the current gain of the transistor to energize a switching relay until the capacitor is discharged.

The delay time in such devices is dependent upon the transistor current gain and is subject to timing variation with the effects of temperature on the transistors and voltage variations of the source, necessitating the incorporation of voltage and/or temperature stabilizing devices for improving the margins of timing accuracy thereof.

Such devices as have been heretofore proposed for vehicle lighting circuits also fail to provide selective control of delayed or immediate de-energization of the controlled lighting circuit without incorporation of additional over-ride and/or defeat and restoration switches, which disrupt the existing vehicle wiring circuitry.

Accordingly, the present invention has among its general objects to provide a time delay circuit controller that is capable of providing accurate timing control operation over a wide range of temperature and voltage variations.

A related object is to provide a time delay controller of the above character for a vehicle lighting circuit and operated from and during a charging interval of a timing capacitor.

A related object is to provide a time delay circuit controller using semi-conductor control devices and a timing capacitor network to provide a delay interval independent of transistor current gain and virtually unaffected by the effects of temperature and voltage variations therein.

Another object is to provide a headlamp delay controller in accordance with the foregoing objects and constructed of low cost, commonly available circuit components, which do not require selection of special transistors nor the use of voltage or temperature stabilizing elements, while providing a close margin of operating accuracy.

Another object is to provide a headlamp time delay controller that is operable from the vehicle headlight control switch and the vehicle ignition switch to provide or afford selective control of delayed or immediate de-energization of the controlled lighting circuit.

SUMMARY

In accordance with the invention there is provided a vehicle headlamp time delay controller operable to temtiming network initiated upon the opening of the headlighting circuit during a charging interval of a capacitor timing network initiated upon the opening of the headlight control switch. Energization of the headlight circuit is maintained through an auxiliary energizing circuit established by and controlled from a normally non-conducting transistor which is rendered conductive when the headlight control switch is moved from closed to open position.

A voltage responsive, threshold switching circuit coupled to the timing capacitor senses the level and polarity of the charge thereon and controls the application of a substantially constant base current drive to the control transistor to maintain substantially full current flow through the relay until the charge on the charging capacitor attains the threshold switching level of the switching circuit. The switching control occurs at a point along the capacitor charging characteristic curve such that battery voltage and semi-conductor component variations have negligible effect on the timing accuracy of the controller.

The headlamp delay circuit theory of operation for the active state is based on the described concept of voltage commutation. The concept involves the instantaneous reversal of voltage at the base of a bipolar transistor from positive to negative immediately after the headlamp switch has been opened. Also, at this time, a capacitor begins charging from a negative potential toward the positive battery voltage until a threshold voltage level has been reached. The concept of voltage commutation enables the voltage across the capacitor to control circuitry that provides a path for headlamp current during the charge time of the capacitor or headlamp delay time.

Selective operation of delayed or immediate de-energization of the headlight circuit is provided in accordance with a predetermined order of operation of the headlight switch relative to the ignition switch, which is connected to the controller by a parallel circuit connection in such manner as to disable operation of the controller whenever the ignition switch is closed. Momentary closing of the ignition switch after the delay period has been initiated cancels any unexpired portion of the delay.

DESCRIPTION OF THE PREFERRED EMBODIMENT

The invention will be described with reference to the accompanying single figure of drawings which is a schematic electrical circuit diagram of a time delay lighting circuit controller constructed in accordance with the principles of the present invention.

In the drawings, there is shown a vehicle wiring circuit including a headlamp circuit 10 and ignition circuit 12, each connected to the positive bus conductor terminal 13 of the negatively grounded vehicle battery source 14 through the vehicle headlight switch 16 and the vehicle ignition switch 18. Conductor 20 extends from the load or lighting circuit side or terminal 21 of headlight switch 16 to the headlamps, one of which is shown at 23 returned to ground. Conductor 26 extends from terminal 27 of the ignition switch connected to the ignition switch controlled accessories, one of which is shown at 28 returned to ground.

The time relay circuit controller is a case-grounded three terminal structure 30 connected in parallel with the vehicle headlight circuit and ignition circuit by three conductors 32, 33 and 34. Conductor 32 is connected to headlight circuit terminal 21 of the headlight switch; conductor 33 is connected to the battery connected side or terminal 22 of the headlight switch and conductor 34 is connected to conductor 26 or, preferably, the ignition accessory terminal 27 of the vehicle ignition switch. Internally, the controller 30 comprises a relay of which the coil is shown at 36, a control transistor 40, timing capacitor 44 and associated voltage divider 46, 48 and an intervening voltage responsive switching circuitry 60 connected between the timing capacitor and the input control electrode 41 of the transistor 40.

One side of relay coil 36 is connected to the collector electrode 42 of transistor 40 and its other side is connected to conductors 33 and 50. Conductor 50 is connected to the front contact 51 of a spaced pair of fixed contacts 51, 52 cooperating with the movable conduct arm 53 operated by the relay coil. Contact arm 53 is normally spring biased as a spring 54 against the back contact 52 of the relay and is connected by conductor 32 to the headlight circuit side or terminal 21 of the headlight switch. Back contact 52 of the relay is connected by circuit conductor 55 to one side of resistor 46 of the aforementioned voltage divider network of which resistor 48 is grounded. The junction point 47 of the divider is connected by circuit conductor 56 to one side of the timing capacitor 44.

Transistor 40 is shown as an NPN transistor whose emitter 43 is grounded. To limit collector leakage current a resistor 62 may be connected between ground and the transistor base electrode, although the resistor can be eliminated if a nominal leakage current can be tolerated.

The voltage responsive switching circuit 60 includes a pair of NPN switching transistors 64, 66, diode 68, auxiliary condenser 70 and resistors 71, 72, 73 and 74, connected as shown. The base input control electrode 75 of transistor 64 is connected by circuit conductor 76 to the other side of main timing capacitor 44, and its emitter 77 is connected to the base electrode 79 of transistor 66 whose emitter 80 is grounded. Operating supply voltage is supplied to the collector electrodes 81, 82 of transistors 64, 66 through the headlight switch 16, conductor 84, diode 68, bus conductor 87, and resistors 72 and 73 of which resistor 72 is a current limiting resistor. But conductor 87 is connected to the junction 85 of diode 68 and the upper potential side of capacitor 70, the other side of which is grounded. In addition to resistors 72 and 73, conductor 87 is connected to one side of resistor 71, the other side of which is connected to the base electrode 75 of transistor 64.

Resistor 74 is connected between the base input electrode 79 of transistor 66 and by conductor 34 to conductor 26 or the accessories terminal side 27 of the vehicle ignition switch 18. Resistor 74 supplies base current drive to transistor 66 to maintain transistor 40 non-conducting whenever the ignition switch is closed, thereby disabling the operation of the controller. Thus, in order to effect the delay, the ignition switch must be opened prior to or in advance of the headlight switch. Inverse operation of these switches, i.e., de-actuation of the headlight switch prior to the ignition switch, disables any delay control of the de-energization of the headlamps, which, in such case, will be de-energized immediately as in normal extinguishing control thereover.

Accordingly, the following operational description will assume that the ignition switch has been opened and the headlight switch is about to be moved or deactuated from its closed, active or circuit completing headlight energizing condition to its open, inactive, or circuit de-energizing position.

With the headlight switch closed or actuated, the capacitors 44 and 70 are charged with the polarities shown, the potential on the upper plate element of capacitor 44 being limited to approximately one-third of the B+ or battery supply voltage by the proportions of the voltage divider 46, 48. Current supplied from the closed headlight switch 16 through diode 68 and resistor 71 biases transistors 64 on and is multiplied by the current gain thereof connected in a current amplifying configuration with transistor 66. Tranistor 66 holds transistor 40 off to prevent current flow through the relay coil 36, the contacts of which will be in the position shown in the inactivated or de-energized condition thereof.

With transistors 64 and 66 on, capacitor 44 thus charges to approximately one-third of the battery voltage through resistors 46, 48 and the base-emitter junctions of transistors 64 and 66. Resistors 46 and 48 additionally serve to limit the initial surge of current through capacitor 44 and the base emitter junctions of transistors 64 and 66.

When the headlight switch is moved from its closed to open position, the voltage at the base of transistor 64 instantaneously changes and is displaced from a slightly positive voltage of about one volt, corresponding to the voltage across the serially connected base emitter junctions of bipolar transistors 64 and 66, to a negative value corresponding to the initial voltage across capacitor 44, or approximately one-third of the battery voltage. With the opening of the headlight switch, the forward biasing drive to transistor 64 is removed and the potential at the base thereof is commutated or reversed in polarity as may be ascertained from consideration of the charge voltages on capacitor 44 and the relative resistance values of resistors 48, 46 and 71 and the headlight circuit resistance.

Resistors 46 and 48 are very much less in ohmic impedance value than resistor 71 and are connected by parallel circuit paths from the upper plate element of capacitor 44 to ground. Resistor 46 includes in its path, through the not yet transferred contacts of the relay, the resistance of the headlamps, which is in the order of approximately one ohm or less. Thus, under these conditions, at the instant the headlamp switch 16 is opened, the depicted upper side or element of capacitor 44 may be considered as being effectively connected to or at ground potential, thereby forcing or displacing the lower plate element thereof negatively below ground by the initial charge on the capacitor 44.

In consequence, transistors 64 and 66 will be back biased by the above described commutating action immediately upon the opening of the headlight switch 16. Coincident with the voltage commutation at the base of transistor 64, capacitor 70 begins discharging principally through resistor 73, which is of lesser resistance value than resistor 71 so that most of the discharge current flows through resistor 73 into the base of transistor 40. Capacitor 70 thus serves to supply energy to the controller system during the transition or transfer time of the relay contacts for a time interval somewhat greater than the latch-up time of the relay, which may be in the order of several milliseconds. This period is very much less than the, say, 90 seconds headlight delay period effective from timing capacitor 44 of the controller.

With transient base current thus supplied from capacitor 70 to the base of transistor 40, transistor 40 saturates to energize the relay coil 36, which then transfers its contacts to the opposite position shown to connect battery voltage to the headlamps over a circuit traced from battery 14, conductors 13, 33, 50, contact 51 and movable arm 53 of the relay, and conductor 32 connected to headlight circuit conductor 20. B+ is also supplied from conductor 20 and 84 to the anode of diode 68 to provide a path through resistor 73 during the delay period for the steady state base current of transistor 40. Transistor 40 thus receives a constant base current drive thereto during its conducting interval.

During the delay period, timing capacitor 44 charges over a circuit from battery 14, conductors 13, 33 and 50, front contact 51 and transferred contact arm 53 of the relay, conductor 84, diode 68, conductor 87, resistor 71, capacitor 44 and resistor 48 to ground. Capacitor 44 thus charges in the opposite direction from the commutated level at the base of transistor 64 toward +12 volt (nominal) battery B+ level.

The circuit delay time is a function of the time constant of the product of timing resistance 71 and capacitor 44. The actual delay effected from the circuit controller will be determined when the charge accumulated on capacitor 44 attains a threshold level corresponding to the forward biasing voltage level at the base of transistor 64 to saturate transistors 64 and 66 to turn them on again. At this time, the charging action of capacitor 44 will be interrupted or terminated by reason of the diode clamping action of the base emitter junctions of transistors 64 and 66.

With transistors 64 and 66 saturated, transistor 40 is back biased and the relay current reduced to zero, causing the movable contact arm 53 to revert to the position shown. This disables the auxiliary energizing circuit path to the headlamp circuit and removes the operating potential and drive for transistors 64 and 66 to turn them off and hold transistors 40 off with the headlight switch opened.

The delay interval can be terminated or cancelled before the expiration thereof by momentarily closing the ignition switch. This action provides base current to saturate transistor 66 which back biases transistor 40 and inhibits the relay coil current.

In a constructed embodiment of the invention the controller exhibited a timing delay period of 87 to 94 seconds over a temperature range of from −40 to +150 degrees Fahrenheit and a variation in supply voltage of from 10 to 14 volts with the following circuit constants listed below for purposes of illustration:

Resistor 46—470 ohms
Resistor 48—200 ohms
Resistor 62—2400 ohms
Resistor 71—300K ohms
Resistor 72—470 ohms
Resistor 73—300 ohms
Resistor 74—22K ohms
Transistor 40, 64, 66—2N3415
Diode 68—IN 914
Capacitor 44—680 $\mu$f.
Capacitor 70—100 $\mu$f.

While the invention has been described as using NPN transistors, it will be understood that transistors of opposite conductivity type can be substituted in the circuit by reversing the polarity of the battery, capacitors and diode.

What is claimed is:

1. A selectively operable time delay controller for a headlamp circuit of a vehicle provided with a source of power, a headlamp switch connecting the headlamp circuit to the source of power, an ignition switch and an ignition switch controlled circuit connected to the source of power through the ignition switch, said headlamp delay controller comprising a three terminal case-grounded network connected by parallel circuits respectively to the power and headlamp circuit sides of the headlamp switch and to the ignition switch controlled circuit side of the ignition switch and including a capacitor timing network therein connected in charging circuit relation with the power source after the headlamp switch is moved from its closed to its open position to maintain the headlamp circuit temporarily energized during a charging interval of the timing capacitor network, the circuit connection of said controller from said ignition switch disabling operation of the controller whenever the ignition switch is closed.

2. A time delay controller in accordance with claim 1 above wherein the capacitor of said timing network charges to a voltage less than that of the voltage of said source to terminate the temporary energization of the headlamp circuit.

3. A time delay controller for a headlamp circuit of a vehicle provided with a source of power and a headlamp switch connecting the headlamp circuit to the source of power, said controller including relay switching means having a pair of normally open contacts connected in shunt with the headlamp switch, said controller also including means controlling the operation of said switching means including a first capacitor coupled to the headlamp circuit side of the headlamp switch and coupled to said relay switching means for operating said relay switching means for a period of time slightly greater than the transfer time of the contacts thereof when the headlamp switch is moved from its closed to its open position and a second capacitor connected in charging circuit relation with said source of power through the transferred contacts of said relay and coupled to said relay switching means to maintain the operated condition thereof during a charging interval of the second capacitor of prolonged duration relative to that effected from the first capacitor.

4. A time delay controller in accordance with claim 3 above including a semi-conductor amplifier device having its output connected in energizing circuit completing relation with said relay switching means and its input coupled to said first and said second capacitors respectively rendering and maintaining said semi-conductor amplifier device conducting when the headlamp switch is moved from its closed to its open position.

5. A time delay controller in accordance with claim 4 above wherein said semi-conductor amplifier device is a switching transistor having a base input control electrode and wherein said controller further includes means for supplying a constant input current drive to the base of said transistor through the transferred contacts of said relay switching means while the transistor is maintained conductive during the charging interval of said second capacitor.

6. A time delay controller in accordance with claim 5 above wherein said controller further includes a voltage responsive switching circuit coupled between said second capacitor and said base input electrode of said transistor.

7. A time delay controller in accordance with claim 6 above wherein said voltage responsive switching circuit comprises a pair of switching transistors connected in a current amplifying configuration.

8. A time delay controller in accordance with claim 7 above wherein said vehicle further includes an ignition switch connecting an ignition switch controlled circuit to the source of power and wherein said controller further includes an electric circuit connection from the controlled circuit side of the ignition switch to a point between said transistors of said current amplifying configuration to disable the controller whenever the ignition switch is closed or when it is opened subsequent to the headlamp switch.

9. A time delay controller for a vehicle lighting circuit energized from a source of power through a light control switch and comprising:

a relay having a coil, a spaced pair of fixed contacts, one of which contacts is connected with the coil to said source, and a contact movable between said fixed contacts and connected to the lighting circuit side of the light control switch, a semi-conductor amplifying device having its output electrodes connected in energizing circuit completing relation with said relay coil and also having an input electrode, a voltage divider connected to the lighting circuit side of said light control switch through the other fixed contact and the movable contact of the relay, a capacitor, one side of which is connected to the juncture of said divider, a resistor connected to the other side of the capacitor and coupled to the movable contact of the relay, and circuit meaans connected between the input electrode of said semi-conductor device and the juncture of said capacitor and resistor and coupled to the lighting circuit side of the light control switch, said circuit means operative upon opening the light control switch to render said semi-conductor device conducting, thereby energizing the relay and connecting the capacitor in charging circuit relation from the source through said one contact and the movable contact of the relay, said resistor and a portion of the voltage divider.

10. A time delay controller in accordance with claim 9 wherein said divider is a resistance divider each of the elements of which has a resistance very much less than that of said resistor and the resistance elements of the divider are proportioned to provide a voltage to said capacitor that is a fractional part of the voltage of the power source.

11. A time delay controller in accordance with claim 9 above wherein said circuit means includes a pair of switching transistors connected in a current amplifying configuration between said capacitor and the input control electrode of said semi-conductor amplifying device.

12. A time delay controller in accordance with claim 11 above wherein said vehicle further includes an ignition switch connecting an ignition switch controlled circuit to the source of power and wherein said controlled further includes an electric circuit connection from the controlled circuit side of the ignition switch to a point between said switching transistors to disable the controller whenever the ignition switch is closed.

13. A time delay controller for a vehicle lighting circuit energized from a source of power through a light control switch, switching means connected across the light control switch to establish an auxiliary energizing circuit for the lighting circuit, means controlling said switching means including a normally non-conducting tranistor having its output connected in controlling relation with said switching means and having a base control input electrode, a current generator including a resistor coupled to the lighting circuit side of said control switch and to the base electrode of the transistor for supplying a constant base current drive thereto, a capacitor coupled to the lighting circuit side of said control switch, and a voltage level reponsive switching circuit connected to the input electrode of the transistor and to said capacitor to maintain the transistor nonconducting and disable the constant current drive therefor when the light control switch is closed, said switching circuit enabling the constant current drive to the transistor when the light control switch is subsequently opened and rendering the transistor conductive until the charge on the capacitor reaches a predetermined level related to the switching voltage level of the switching circuit.

References Cited

UNITED STATES PATENTS

| | | | |
|---|---|---|---|
| 3,274,434 | 9/1966 | Miller | 315—82 |
| 3,389,296 | 6/1968 | Carruth | 315—77 |
| 3,211,951 | 10/1965 | Skinner et al. | 315—76 |
| 3,391,302 | 7/1968 | Weingarden | 315—83 |
| 3,374,394 | 3/1968 | Miller | 315—82 |
| 3,388,288 | 6/1968 | Kibler | 315—77 |
| 3,440,487 | 4/1969 | Win et al. | 315—77 |

JAMES D. KALLAM, Assistant Examiner

B. ESTRIN, Assistant Examiner

U.S. Cl. X.R.

315—83, 209, 241; 317—141, 142